April 29, 1941.  R. A. JOHNS  2,240,138
SLIDE FASTENER LOCK
Filed July 31, 1940
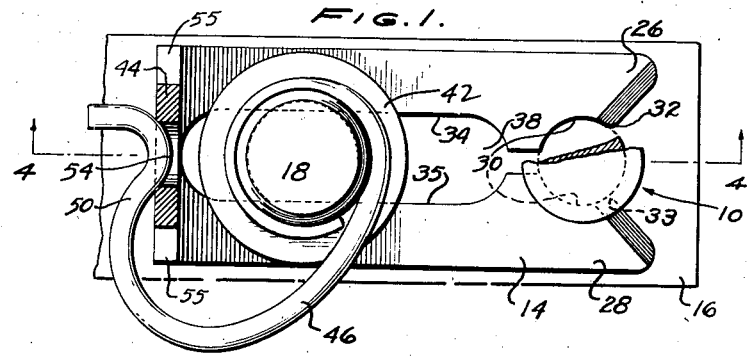
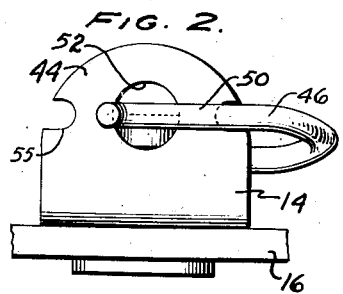
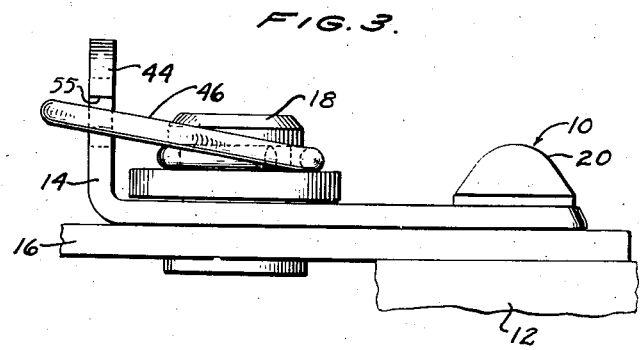
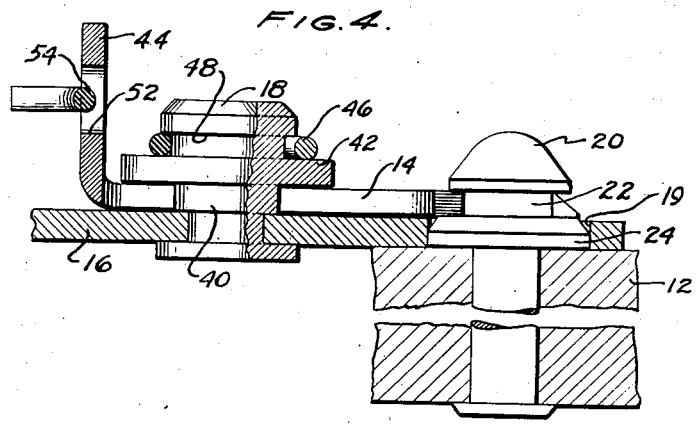
INVENTOR
RAY A. JOHNS
BY
ATTORNEYS Patented Apr. 29, 1941

2,240,138

UNITED STATES PATENT OFFICE 2,240,138

SLIDE FASTENER LOCK

Ray A. Johns, Borinquen Field, P. R.

Application July 31, 1940, Serial No. 348,903

3 Claims. (Cl. 24—211)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a fastener means for releasably securing together removable parts of articles and more particularly to the provision of means for holding said fastener means in fastening position.

The invention contemplates an improvement in slide fasteners of the bifurcated end type frequently used for securing the covers to the assembly boxes or housings of electrical and radio apparatus, or for securing such apparatus to shock proof mounting units, the advantages and features of which are more particularly described hereinafter.

In the drawing which illustrates my invention in combination with a conventional slide fastener, and wherein the views are greatly enlarged, common dimensions of a slide fastener of the type shown being approximately one inch in length and seven-sixteenths inch in width:

Figure 1 is a plan view with parts broken away and in section showing my locking arrangement as applied to a conventional type slide fastener;

Figure 2 is a rear elevation view of the device shown in Figure 1;

Figure 3 is a side elevation view of the device shown in Figure 1; and

Figure 4 is a view, partly in section and partly in elevation, taken on the line 4—4 of Figure 1.

Referring to the drawing, the slide fastening device will be seen to comprise a stud 10 fixedly secured to the main or supporting structure 12, and a slide fastener element 14 slidably secured to the removable or supported structure 16 by means of a stud 18. There is provided in the removable structure 16 an aperture 19 adapted to register with stud 10 in the main structure and of a size sufficient to receive said stud. The stud 10 is provided with a head 20, a cylindrical or neck portion 22 of less diameter than the head and of a heighth sufficient to receive the slide fastener member, and a rigidly attached collar or flange 24 adjacent the portion 22 and of greater diameter than said portion, to provide an abutment for the stud with respect to the main structure so as to position the portion 22 of the stud for receiving the slide member.

The slide member 14 is in the form of a bifurcated plate having prongs 26 and 28. The outer ends of the prongs flare outwardly to provide a V-shaped notch to serve as a guide in seating the fastener element in engagement with the neck portion of the stud. Adjacent each of the flared portions of the V-shaped notch, there is provided on each prong an arcuate portion 30 of a curvature conforming to the circumference of the cylindrical portion 22, and the arcuate portions complementarily provide an arcute recess to engage the neck portion of the stud in close fitting relationship. The mouth of the recess formed by the arcuate portions, as determined by points 32 and 33, is of less width than the diameter of the cylindrical portion 22 of the stud 10 so as to provide a snap-action engagement between the prongs and the cylindrical portion 22. The prongs 26 and 28 are provided with further recesses 34 and 35 to complementarily form a slot 38 of sufficient width to receive a neck, or cylindrical portion 40 of the stud 18. Adjacent the neck portion 40 and positioned on the stud so as to be spaced from the supported member 16 is a flange portion 42 of larger diameter than said portion 40 so as to secure the slide element 14 in fixed lateral relation to the supporting structure. Said neck portion 40, in cooperation with the slot 38, serves as one guide for the fastener element and the V-shaped notch serves as the other. The rear portion of the slide member is upturned to provide an ear 44 for manipulating the slide element.

Such a slide fastener is subject to the disadvantages that the snap-on action is dependent upon the resistance to shear of the metal from which the prongs of the bifurcated slide member are constructed, and after frequent manipulation, the modulus of elasticity of said member will become sufficiently reduced that it is no longer resilient, at which time the snap-on action will become ineffective. Also, such a slide fastener, being dependent on friction for its locking action with the stud, will quickly become worn at the mouth to such an extent that it will thereafter be ineffective. Provision has heretofore been made to maintain the fastener closed in the event of failure of the above-described types, or closed against inadvertent displacement, by the use of a wire passed through an aperture in the head of the stud and secured to the slide fastener, but this method of securing the fastener is tedious to apply and remove, making it objectionable where quick removability is desired and defeating the purpose of the releasable fastener.

In order to overcome these objections and defects, I have provided a spring clip member 46 attached to the head of the stud 18, as illustrated, by resilient engagement with an annular groove 48 in the head of the stud. The spring clip has a free end 50 adapted to engage the slide fastener in such a manner as to maintain it yieldingly urged against the stud in the main structure. As illustrated, a recess in the form of aperture 52 is provided in the ear 44 of the slide element to provide a point of engagement for the free end of the spring clip, the free end being formed with a bulge or lobe portion 54 adapted to engage said recess.

The upturned portion of ear 44 is also provided with notches 55 on each side to facilitate placement of the bulge portion 54 in the recess 52. These notches reduce the radius from stud 18 to the corners of the upturned portion thereby reducing the distortion, or possibly deformation, of the spring clip necessary to get the bulge portion past the corners. The notches also serve as a guide when fastening and unfastening the spring clip. While only one of the notches is used at a time, they are preferably placed on both sides of the ear 44 during manufacturing, as a matter of convenience, in order to enable either right or left hand assembly of the spring clip.

The spring clip may be made of sufficient reach that the fastener may be manipulated against the force of the spring to release same, but for reasons of efficiency and reduction of size, I prefer that it be of sufficient length only to engage the recess 52 in the rear portion of the slide so that the fastener is under substantially the maximum spring load at all times; and that to remove the fastener element, the spring must first be temporarily dislocated from the recess. While the sring is preferably attached to the stud 18, it will be appreciated that it may be attached to the stud 10 if desired.

It will therefore be seen that the fastening means I have provided not only serves to overcome the above-mentioned defects and disadvantages of the conventional slide fastener as heretofore used, but it also makes it unnecessary to make an arcuate recess, with the precision heretofore required, or to use materials having as great a modulus of elasticity as heretofore required for the bifurcated plate member.

A further advantage of my fastening element is that, since the spring is releasably connected to the slide element, it is releasable from locking engagement in two steps, being first, disengagement of the spring, and second, disengagement of the slide-locking element. In this way, the forces holding the fastener in locked position are divided during release of the fastener resulting in greater ease of manipulation with no reduction of locking efficiency.

Other advantages and applications of my slide lock fastening device will readily occur to those skilled in the art in which it is used. The language and expressions which have been employed throughout the specification are used as terms of description, only, and not of limitation, and said terms are intended to include all the equivalents and such modifications as are possible to be employed within the scope of the appended claims.

I claim:

1. A readily releasable slide fastener for securing a pair of articles together comprising, in combination, a stud carried by one of said articles and a second stud carried by the other of said articles, a bifurcated plate member slidably mounted on said first-mentioned stud in fixed lateral relation to said article, said plate member having a recess in the fore end thereof, said recess having a mouth narrower than the width of said recess, said second stud having a recess portion of width corresponding to the width of said first-mentioned recess and adapted to be received therein in close fitting relation, and spring means attached to said first-mentioned stud and connecting with said plate member for yieldingly urging said plate member into engagement with said second stud.

2. In combination, a pair of members to be connected, one of said members constituting a main structure and the other a removable structure, each of said members having a stud attached thereto, a bifurcated element slidably secured to one of said members by the stud attached to said member, said bifurcated element having a V-shaped notch in the split end thereof and said stud attached to the other of said members having a cooperating portion adapted to receive said V-shaped notch and to restrain said slidable element against lateral displacement with respect to its direction of sliding, a resilient member attached to one of said studs and adapted to engage said bifurcated element in such manner as to resiliently urge said element into engagement with said cooperating portion of the stud adapted to receive said V-shaped notch.

3. Readily releasable fastening means for securing a removable structure to a main structure, said means comprising a stud adapted to be fixedly attached to one of said structures, a second stud adapted to be fixedly attached to the other of said structures, a bifurcated element adapted to be slidably secured to one of said structures by said stud therein, said element and the other of said studs having cooperating portions adapted to engage each other to restrain said bifurcated element against lateral displacement with respect to its direction of sliding, and a spring element attached to one of said studs and adapted to urge said bifurcated element into engagement with said stud having said cooperating portion.

RAY A. JOHNS.